(12) United States Patent
Guduru et al.

(10) Patent No.: US 12,495,275 B2
(45) Date of Patent: Dec. 9, 2025

(54) SYSTEMS AND METHODS FOR LOCATION MANAGEMENT FUNCTION ANALYTICS

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Raquel Morera Sempere, Weehawken, NJ (US); Ambreen Habib, Golden, CO (US)

(73) Assignee: Verizon and Patent Licensing Inc., Basking Ridge, NJ (US)

( * ) Notice: Subject to any disclaimer, the term of this patent is extended or adjusted under 35 U.S.C. 154(b) by 544 days.

(21) Appl. No.: 18/051,614

(22) Filed: Nov. 1, 2022

(65) Prior Publication Data

US 2024/0147189 A1    May 2, 2024

(51) Int. Cl.
*H04W 4/029* (2018.01)
*H04W 64/00* (2009.01)

(52) U.S. Cl.
CPC ........... *H04W 4/029* (2018.02); *H04W 64/00* (2013.01)

(58) Field of Classification Search
CPC ....... H04W 4/029; H04W 64/00; H04W 4/20; H04W 24/08; H04W 4/02; H04W 24/02; H04W 24/04; H04W 60/04; H04W 24/10; H04W 4/50; H04W 84/042; H04W 4/90; H04W 48/16; H04W 4/40; H04W 8/02; H04W 4/021; H04W 84/06; H04W 36/322; H04W 48/04; H04W 24/00; H04W 28/0226; H04W 4/44; H04W 24/06; H04W 28/0925; H04W 4/46; H04L 41/14; H04L 41/5032; H04L 43/06; H04L 67/52; H04L 41/5022; H04L 47/127; H04L 47/125; H04L 47/2416; H04L 65/40; H04L 41/06; H04L 41/5016; H04L 41/5096; G01S 5/0236; G01S 5/0009; G01S 5/04; G01S 5/0278

See application file for complete search history.

(56) References Cited

U.S. PATENT DOCUMENTS

2023/0124118 A1* 4/2023 Khirallah ............... H04W 4/029
                                                                     455/456.1

FOREIGN PATENT DOCUMENTS

WO    WO-2023099039 A1 *  6/2023  .......... H04W 64/006

\* cited by examiner

*Primary Examiner* — Diane D Mizrahi
*Assistant Examiner* — Jing Gao

(57) ABSTRACT

Systems and methods described herein provide an interface for a Network Data Analytics Function (NWDAF) to extract event data from a Location Management Function (LMF) located in a core network or radio access network (RAN). An NWDAF receives, from a network device, an information request for a location-assistance service. The NWDAF sends to the LMF a data request based on the information request, and receives, from the LMF, event data responsive to the data request. The NWDAF generates an analytics report based on the event data.

20 Claims, 9 Drawing Sheets

SYSTEMS AND METHODS FOR LOCATION MANAGEMENT FUNCTION ANALYTICS

BACKGROUND

A Fifth Generation system (5GS) may include a core network that supports and manages 5G radio access networks (RANs), providing various services and enabling connections to other networks (e.g., connections to the Internet, etc.). A location management function (LMF) is a positioning related network function (NF) introduced in the 5GS. The 5GS may support location determination for a user equipment (UE) device using the LMF. The LMF can be located in the 5GS as part of either a core network or as part of a 5G RAN depending on different use cases.

DETAILED DESCRIPTION OF EXAMPLE EMBODIMENTS

Figure 1:
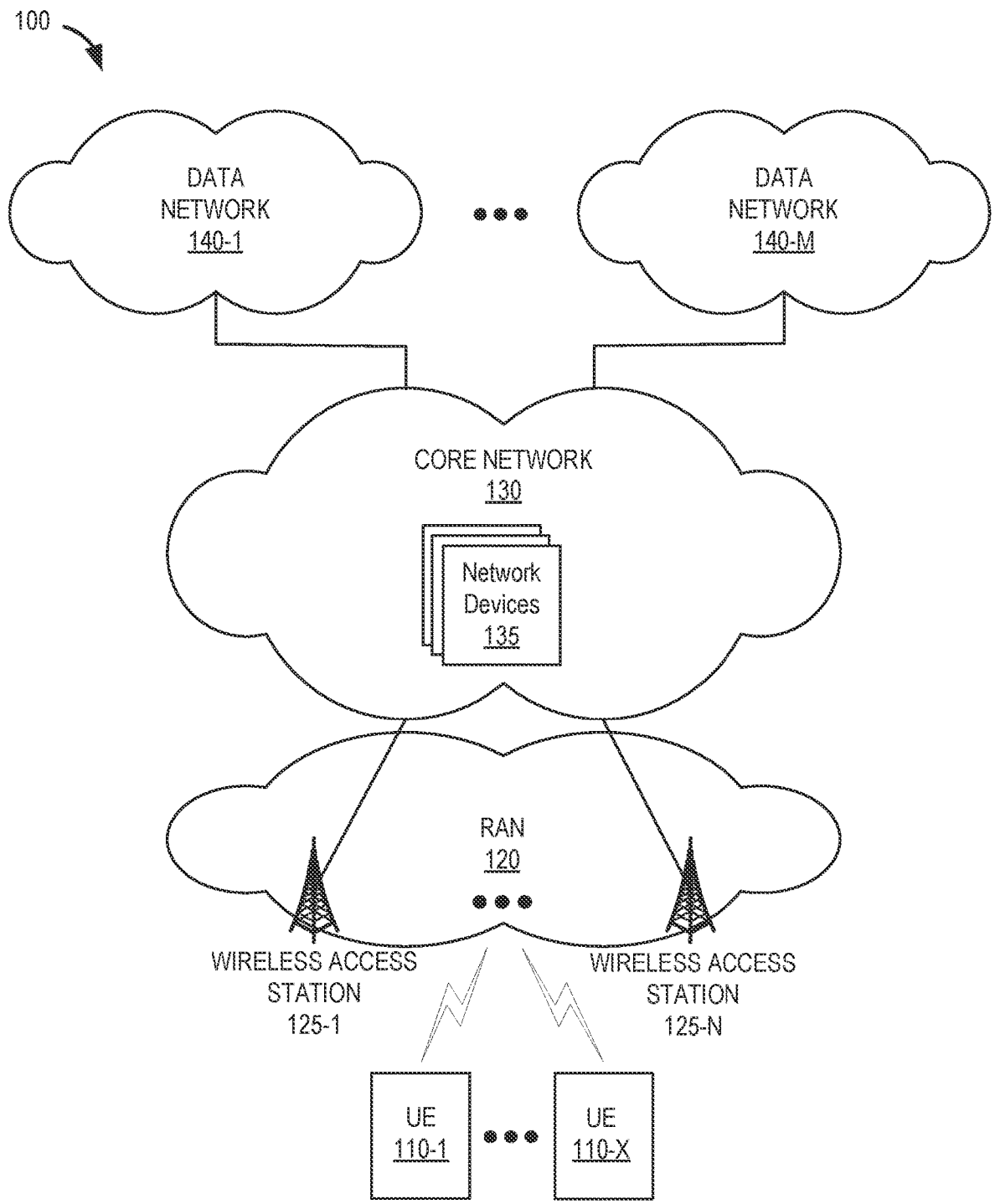
FIG. 1 is a diagram that depicts an exemplary network environment in which systems and methods described herein may be implemented.

The following detailed description refers to the accompanying drawings. The same reference numbers in different drawings may identify the same or similar elements.

The location management function (LMF) is a positioning related network function (NF) introduced in 5GS. The LMF supports location determination for a user equipment (UE) device based on positioning methods such as Downlink Time difference of Arrival (DL-TDOA), Uplink Time difference of Arrival (UL-TDOA), Uplink Angle of Arrival (UL-AoA), (Multi-round trip time (RTT), DL positioning resources (PRS) for DL Angle of Departure (AoD), global navigation satellite system (GNSS) based methods, etc. The LMF also obtains non-UE associated position assistance data from the 5G Next Generation (NG) RAN. The LMF may use the location/position data to provide broadcast assistance data to UE devices, for example. When the LMF is located in 5GS, the NG RAN exchanges the necessary positioning information and measurements with the LMF via the New Radio Positioning Protocol Annex (NRPPa) protocol.

The LMF may be located in the 5GS as part of either a core network or as part of a NG RAN depending on the use case. For example, some vertical use cases require positioning accuracy with certain positioning determination latency. For such use cases, it may be necessary to have the LMF be part of the RAN. For other use cases that do have positioning latency requirements, the LMF can be part of the core network to provide centralized location-assistance services. In some cases, combinations of core-based and RAN-based LMFs may be used.

An LMF NF may have accurate UE location information regardless of LMF deployment in public networks or various private network deployment options. Such deployment options may include a multi operator core network (MOCN), a stand-alone non-public network (SNPN), or a public network integrated non-public network (PNI-NPN) with use in outdoor, indoor, or hybrid environments. The LMF may support operations for critical network slices, such as network slices for Ultra-Reliable Low-Latency Communication (URLLC), Time-Sensitive Networking (TSN), Vehicle-to-Everything (V2X) communications, or other network slices that have dependency on location information.

A Network Data Analytics Function (NWDAF) is an operator-managed network analytics logical function defined for 5GS. The NWDAF may be responsible for providing network analysis information in response to requests from network functions. For example, NWDAF can provide 5G analytics, closed loop automation, and machine learning. Thus, the NWDAF provides a vendor agnostic solution for end-to-end analytics that consumes metrics and events from 5G core network functions (NFs) and operations, administration, and maintenance (OAM) platforms.

Currently, when operators deploy the NWDAF to obtain key performance indicators (KPIs) and other metrics, the NWDAF cannot include any event/traffic data from the LMF NFs. Currently, there is no standardized interface to extract, from the NWDAF, LMF metrics for network slices that are dependent on location information. There is also no standardized interface to support LMF-NWDAF exchanges.

Systems and methods described herein may provide an interface for the NWDAF to extract events from an LMF instance when operators deploy the LMF, such as for a given slice type. The NWDAF in a 5G core includes logic and/or intelligence to determine when (e.g., based on network slice selection assistance information (NSSAI) of a given slice) to collect events from the LMF regardless of the LMF deployment location in the 5GS (either in core or RAN) and for either macro or private networks. According to an implementation, an NWDAF in a core network may receive, from a network device, an information request for a location-assistance service. The NWDAF may send to the LMF a data request based on the information request, and may receive, from the LMF, event data responsive to the data request. The NWDAF may then generate an analytics report based on the event data, as described in detail below.

FIG. 1 is a diagram of an example environment 100 in which systems and/or methods, described herein, may be implemented. As shown in FIG. 1, environment 100 may include UE devices 110-1 to 110-X (referred to herein collectively as "UE devices 110" and individually as "UE device 110"), a radio access network (RAN) 120, a core network 130, and data networks 140-1 to 140-M (referred to herein collectively or generically as "data network 140"). RAN 120, core network 130, and data network 140 may be collectively referred to as a transport network.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a telematics system in a vehicle; a laptop computer, a tablet computer, or another type of portable computer; a desktop computer; a customer premises equipment (CPE) device, such as a set-top box or a digital media player, a WiFi access point, Fixed wireless access (FWA) device, an automated guided vehicle (AGV), a smart television, etc.; a portable gaming system; global positioning system (GPS) device; a home appliance device; a home monitoring device; an Internet of Things (IoT) device; and/or any other type of computer device with wireless communication capabilities and a user interface. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication. In still other implementations, UE device 110 may include a Redcap (Reduced capability) device that is used for applications such as industrial wireless sensors.

RAN 120 may enable UE devices 110 to connect to core network 130 for mobile telephone service, Short Message Service (SMS), Multimedia Message Service (MMS), Internet access, cloud computing, and/or other types of data services. RAN 120 may include wireless access stations 125-1 to 125-N (referred to herein collectively or generically as "wireless access station 125"). Each wireless access station 125 may service a set of UE devices 110. For example, wireless access station 125-1 may service some UE devices 110 when the UE devices 110 are located within the geographic area serviced by wireless access station 125-1, while other UE devices 110 may be serviced by another wireless access station 125 when the UE devices 110 are located within the geographic area serviced by the other wireless access station 125.

Wireless access station 125 may include a 5G base station (e.g., a next generation Node B (gNB)) that includes one or more radio frequency (RF) transceivers configured to send and receive 5G New Radio (NR) wireless signals. According to an implementation, a wireless access station 125 may include a gNB or its equivalent with multiple distributed components, such as a central unit (CU), a distributed unit (DU), a remote unit (RU or a remote radio unit (RRU)), or another type of component to support distributed arrangements. In some implementations, wireless access station 125 may also include a Fourth Generation (4G) base station (e.g., an eNodeB). Furthermore, in some implementations, wireless access station 125 may include a Multi-Access Edge Computing (MEC) system that performs cloud computing and/or provides network processing services for UE devices 110. For example, according to implementations described herein, wireless access station 125 and/or a MEC system in RAN 120 may include one or more LMF instances.

Core network 130 may manage communication sessions for UE devices 110. Core network 130 may provide mobility management, session management, authentication, and packet transport, to support wireless communication services for UE devices 110. Core network 130 may further provide access to data networks 140. Core network 130 may be compatible with known wireless standards which may include, for example, 3GPP® 5G® (non-standalone (NSA) and standalone (SA)), Long-Term Evolution (LTE®), LTE-Advanced®, Global System for Mobile Communications (GSM®), etc. For example, core network 130 may establish an Internet Protocol (IP) connection between UE device 110 and a particular data network 140. Core network 130 may include various types of network devices 135, which may implement different network functions described further herein.

Data networks 140 may each include a packet data network. A particular data network 140 may include, and/or be connected to and enable communication with, a local area network (LAN), a wide area network (WAN), a metropolitan area network (MAN), an optical network, a cable television network, a satellite network, a wireless network, an intranet, or a combination of networks. Some or all of a particular data network 140 may be managed by a communication services provider that also manages core network 130, RAN 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2A:
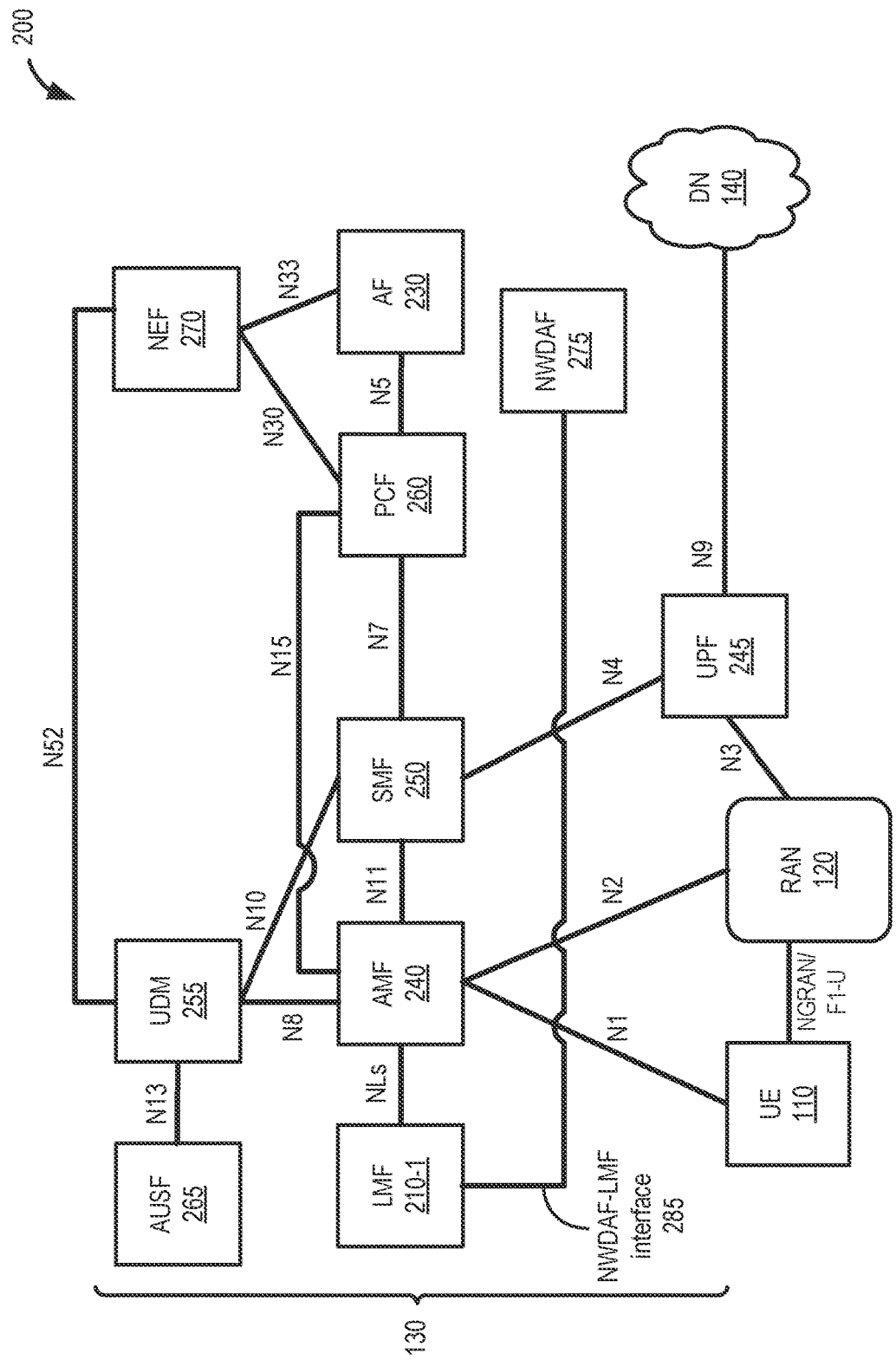
FIGS. 2A and 2B are diagrams illustrating network portions for supporting an LMF interface to a Network Data Analytics Function (NWDAF), according to implementations described herein.

FIG. 2A is a diagram illustrating a network portion 200 that includes exemplary components of environment 100 in the context of an LMF deployed in core network 130, according to an implementation described herein. As shown in FIG. 2A, network portion 200 may include a UE device 110, RAN 120, data network 140, an LMF 210-1, and various other components of core network 130 described below. While FIG. 2A depicts a single instance of the network functions in network portion 200 for illustration purposes, in practice, there may be multiple instances of one or more network functions.

The components depicted in FIG. 2A may be implemented as dedicated hardware components (e.g., network devices 135) or as virtualized functions implemented on top of a common shared physical infrastructure using software defined networking (SDN). For example, an SDN controller may implement one or more of the components of FIG. 2A using an adapter implementing a virtual machine, a containerized network function (CNF) container, an event driven serverless architecture interface, and/or another type of SDN architecture. The common shared physical infrastructure may be implemented using one or more devices 300 described below with reference to FIG. 3 in a cloud computing center associated with core network 130.

As shown in FIG. 2A, components of core network 130 may include an access and mobility management function (AMF) 240, a User Plane Function (UPF) 245, a Session Management Function (SMF) 250, a Unified Data Management (UDM) 255, a Policy Control Function (PCF) 260, an Authentication Server Function (AUSF) 265, a Network Exposure Function (NEF) 270, and an NWDAF 275. In some implementations, LMF 210-1 and an Application Function (AF) 230 may also be considered part of core network 130.

LMF 210-1 may obtain downlink location measurements or a location estimate from UE device 110, uplink location measurements from RAN 120, and/or non-UE associated assistance data from RAN 120. LMF 210-1 may receive measurements and assistance information from the RAN 120 and the UE device 110, via the AMF 240 over an NLs interface to compute the position of UE device 110. According to implementations described herein, LMF 210-1 may provide positioning data to NWDAF 275 via an NWDAF-LMF interface 285.

AF 230 may provide services associated with a particular application, such as, for example, accessing NEF 270, interacting with a policy framework for policy control, application influence on traffic routing, and/or other types of applications. AF 230 may request location/positioning services. In instances where AF 230 is outside of core network 130 and/or is not a trusted device, NEF 270 may expose to AF 230 the 5GS capability to support the location services.

AMF 240 may perform registration management, connection management, reachability management, mobility management, lawful intercepts, Short Message Service (SMS) transport, session management message transport between UE device 110 and SMF 250, access authentication and authorization, location services management, functionality to support non-3GPP access networks, and/or other types of management processes.

UPF 245 may maintain an anchor point for intra/inter-RAT mobility, maintain an external Packet Data Unit (PDU) point of interconnect to a particular data network 140, perform packet routing and forwarding, perform the user plane part of policy rule enforcement, perform packet inspection, perform lawful intercept, perform traffic usage reporting, perform quality of service (QoS) handling in the user plane, perform uplink traffic verification, perform transport level packet marking, perform downlink packet buffering, forward an "end marker" to a RAN 120 node (e.g., wireless access station 125), and/or perform other types of user plane processes.

SMF 250 may perform session establishment, session modification, and/or session release, perform IP address allocation and management, perform Dynamic Host Configuration Protocol (DHCP) functions, perform selection and control of UPF 245, configure traffic steering at UPF 245 to guide the traffic to the correct destinations, terminate interfaces toward PCF 260, perform lawful intercepts, charge data collection, support charging interfaces, control and coordinate charging data collection, perform downlink data notification, manage roaming functionality, and/or perform other types of control plane processes for managing user plane data.

UDM 255 may maintain subscription information for UE devices 110, manage subscriptions, generate authentication credentials, handle user identification, perform access authorization based on subscription data, perform NF registration management, maintain service and/or session continuity by maintaining assignment of SMF 250 for ongoing sessions, support SMS message delivery, support lawful intercept functionality, and/or perform other processes associated with managing user data.

PCF 260 may support policies to control network behavior, provide policy rules to control plane functions (e.g., to SMF 250), access subscription information relevant to policy decisions, perform policy decisions, and/or perform other types of processes associated with policy enforcement.

AUSF 265 may perform authentication. For example, AUSF 265 may implement an Extensible Authentication Protocol (EAP) authentication server and may store authentication keys for UE devices 110.

NEF 270 may expose capabilities and events to other NFs, including third party NFs, AFs, edge computing NFs, and/or other types of NFs. Furthermore, NEF 270 may secure provisioning of information from external applications to core network 130, translate information between core network 130 and devices/networks external to core network 130, support a Packet Flow Description (PFD) function, and/or perform other types of network exposure functions, including exposing capabilities of LMF 210, as described above.

NWDAF 275 may include a network device that may provide functions and/or services specified by a standards entity (e.g., 3GPP, etc.) and/or of a proprietary nature. NWDAF 275 may collect analytics information associated with RAN 120 and/or core network 130. For example, NWDAF 275 may collect accessibility KPIs (e.g., a Radio Resource Control (RRC) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), and/or other types of transport network KPIs. Additionally, NWDAF 275 may include logic that supports collection of LMF data (e.g., positioning data) from LMF 210-1 and distribution of LMF analytics. As described further herein, NWDAF 275 may use NWDAF-LMF interface 285 to request and collect LMF-related KPIs/data from LMF 210-1.

Figure 2B:
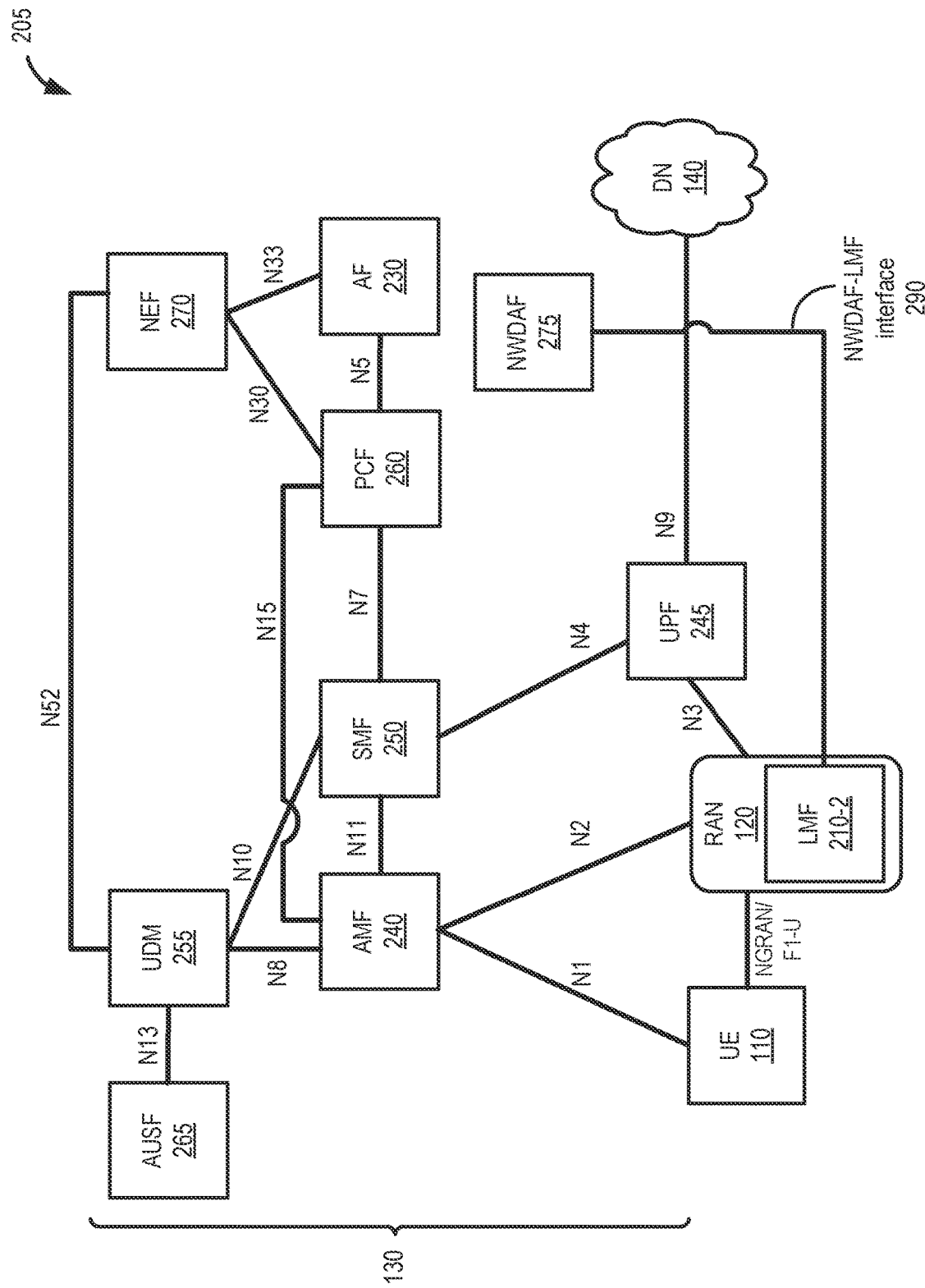

FIG. 2B is a diagram illustrating a network portion 205 that includes exemplary components of environment 100 in the context of an LMF deployed in RAN 120, according to an implementation described herein. As shown in FIG. 2B, network portion 205 may include a UE device 110, RAN 120, data network 140, an LMF 210-2, and various other components of core network 130. While FIG. 2B depicts a single instance of the network functions in network portion 205 for illustration purposes, in practice, there may be multiple instances of one or more network functions.

As described above in connection with FIG. 2A, the components depicted in FIG. 2B may be implemented as dedicated hardware components (e.g., network devices 135) or as virtualized functions implemented on top of a common shared physical infrastructure using SDN. In contrast with network portion 200, in network portion 205 LMF 210-2 may be a local LMF instance within RAN 120. For example, LMF 210-2 may be instantiated in compute resources associated with wireless access station 125 (not shown in FIG. 2B).

LMF 210-2 may obtain downlink location measurements or a location estimate from UE device 110, uplink location measurements from RAN 120, and/or non-UE associated assistance data from RAN 120 without relying on AMF 240. According to implementations described herein, LMF 210-2 may provide positioning data to NWDAF 275 via an NWDAF-LMF interface 290.

Other components of core network 130 in network portion 205 may be similar to those of network portion 200 described above, including AF 230, AMF 240, UPF 245, SMF 250, UDM 255, PCF 260, AUSF 265, NEF 270, and NWDAF 275. Additionally, NWDAF 275 may include logic that supports collection of LMF data from LMF 210-2 and distribution of LMF analytics. As described further herein, NWDAF 275 may use NWDAF-LMF interface 290 to request and collect LMF-related KPIs/data from LMF 210-2.

Although FIGS. 2A and 2B show certain components of network portions 200/205, in other implementations, network portions 200/205 may include fewer components, different components, differently arranged components, or additional components than depicted in FIGS. 2A and 2B. For example, although not illustrated in FIG. 2A, core network 130 may include other network functions, such as a Charging Enablement Function (CEF), a Network Repository Function (NRF), a Network Slice Selection Function (NSSF), a NSSF OAM platform, etc. Additionally or alternatively, one or more components of network portions 200/205 may perform functions described as being performed by one or more other components of network portion 200/205. Furthermore, while particular interfaces (e.g., N1, N2, N3, N4, N5, N7, N8, N9, N10, N13, N15, N30, N33, N52, NLs, NGRAN/F1-U, etc.) are illustrated with respect to particular function nodes in FIGS. 2A and 2B, some network functions may include a reference point architecture that includes point-to-point interfaces between particular function nodes.

Figure 3:
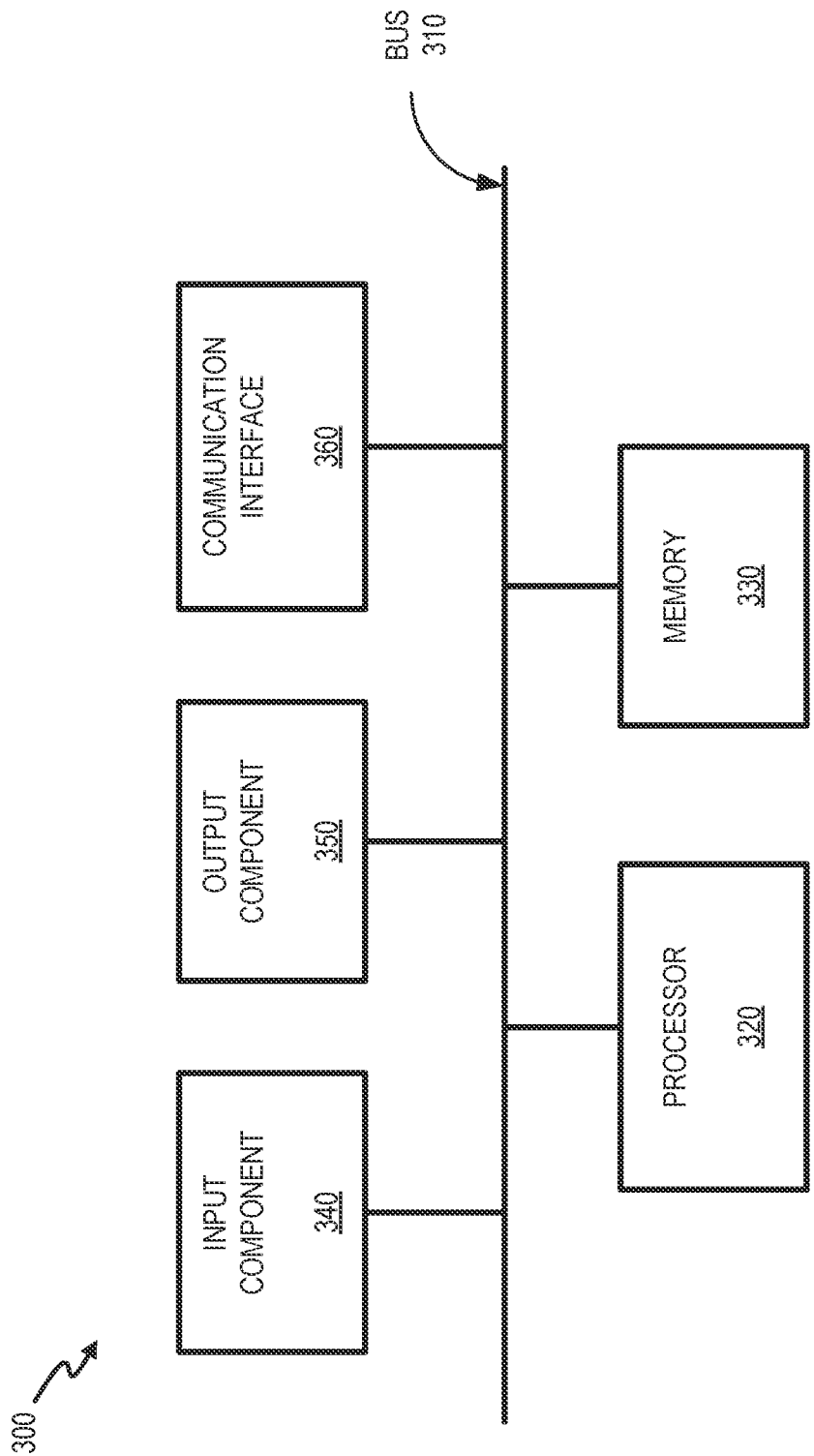
FIG. 3 is a diagram of example components of a device according to an implementation described herein.

FIG. 3 illustrates example components of a device 300 according to an implementation described herein. UE device 110, wireless access station 125, network device 135, LMF 210-1/210-2 (referred to herein generically as "LMF 210"), AF 230, AMF 240, UPF 245, SMF 250, UDM 255, PCF 260, AUSF 265, NEF 270, NWDAF 275, and other devices in environment 100 may each include one or more devices 300. Device 300 may include a bus 310, a processor 320, a memory 330, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively, or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, additional components, different components, or differently arranged components than those depicted in FIG. 3. Additionally, or alternatively, one or more components of device 300 may perform one or more tasks described as being performed by one or more other components of device 300.

Figure 4:
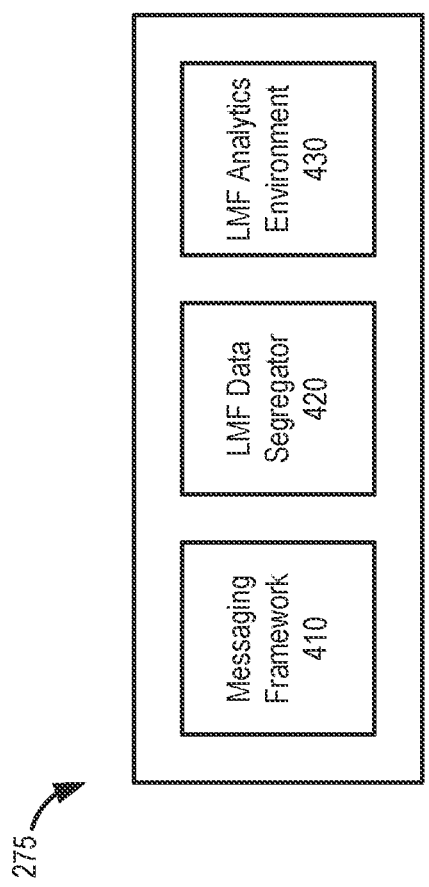
FIG. 4 is a block diagram showing example logical components of an NWDAF for LMF analytics.

FIG. 4 is a block diagram illustrating examples of logical components of NWDAF 275 to support an LMF interface. NWDAF 275 may generate analytic reports and provide requested reports to different types of network functions (referred to herein as "consumers" or "NF consumers"). Known consumers for NWDAF services include PCFs (e.g., PCF 260), NSSFs, AF (e.g., AF 230), AMFs (e.g., AMF 240), SMFs (e.g., SMF 250), UDMs (e.g., UDM 255), OAM functions, and CEFs.

As shown in FIG. 4, NWDAF 275 may include a messaging framework 410, an LMF data segregator 420, and an LMF analytics environment 430. According to other exemplary embodiments, NWDAF 275 may include additional, different, and/or fewer components. For example, NWDAF 275 may include a data collection coordination function (DCCF), an analytics data repository function (ADRF), and/or another type of component or logic that may facilitate data collection, analytic, and/or subscription services. The components of FIG. 4 may be implemented, for example, by processor 320 in conjunction with memory 330.

Messaging framework 410 may manage standardized interfaces to allow NF consumers to subscribe to and unsubscribe from different analytic events. For example, NWDAF 275 may receive, via messaging framework 410, an analytics request from a NF consumer. The analytics request may be part of a request-response model or a subscription-notification model. The analytics request may include, for example, an Nnwdaf_AnalyticsSubscription_Subscribe message, an Nnwdaf_AnalyticsSubscription_Unsubscribe message, or an Nnwdaf_AnalyticsInfo_Request message. The analytics request may further include an analytics identifier that may correspond to LMF analytics (e.g., requiring event data from an LMF instance, such as LMF 210-1 or 210-2). Thus, messaging framework 410 modifies existing NWDAF interfaces with NF consumers to request LMF-related analytics. Messaging framework 410 may also use standardized interfaces to notify NF consumers that have a subscription about corresponding observed events. For example, messaging framework 410 may provide to an NF consumer an Nnwdaf_AnalyticsSubscription_Notify message when a requested analytics report is available.

To support these analytics requests, messaging framework 410 may use new interfaces (e.g., interfaces 285/290) to extract events from LMF 210 when operators deploy an LMF for a given slice type in private and public networks. For example, messaging framework 410 may support data collection from LMF 210 via standardized event exposure messages (e.g., Nlmf_EventExposure_Subscribe, Nlmf_EventExposure_Request, Nlmf_EventExposure_Unsubscribe, etc.). Event exposure messages may request (e.g., from LMF 210) LMF data, such as the exact location of a UE (UE device 110), a positioning technique that has been used by the UE device 110, positioning accuracy, positioning latency, placement of the LMF 210 (e.g., in core network 130 or RAN 120), and/or abnormal behavior information. Messaging framework 410 may also use standardized interfaces to receive responses from an LMF 210 about corresponding LMF data. For example, messaging framework 410 may receive (e.g., from LMF 210) an Nlmf_EventExposure_Notify message when a requested LMF event data is available.

LMF data segregator 420 may provide for segmentation of LMF data. For example, LMF data segregator 420 may identify a data source (e.g., LMF 210-1, LMF 210-2, etc.), a slice-type indicator (e.g., URLLC, TSN, V2X, etc.), or another type of indicator for incoming LMF data. LMF data segregator 420 may direct incoming LMF data to LMF analytics environment 430.

LMF analytics environment 430 may include a secure network location, such as an isolated storage location, a secure enclave, trusted execution environment, or another construct that is isolated from other network data. LMF analytics environment 430 may include machine learning components and analytics models for LMF analytics. In one implementation, LMF analytics environment 430 may be executed in isolated containers and use secure applications.

Although FIG. 4 shows examples of logical components of NWDAF 275, in other implementations, NWDAF 275 may include fewer components, different components, or additional components than depicted in FIG. 4. In addition, functions described as being performed by one of the logical components in FIG. 4 may alternatively be performed by another one or more of the components of NWDAF 275.

Figure 5:
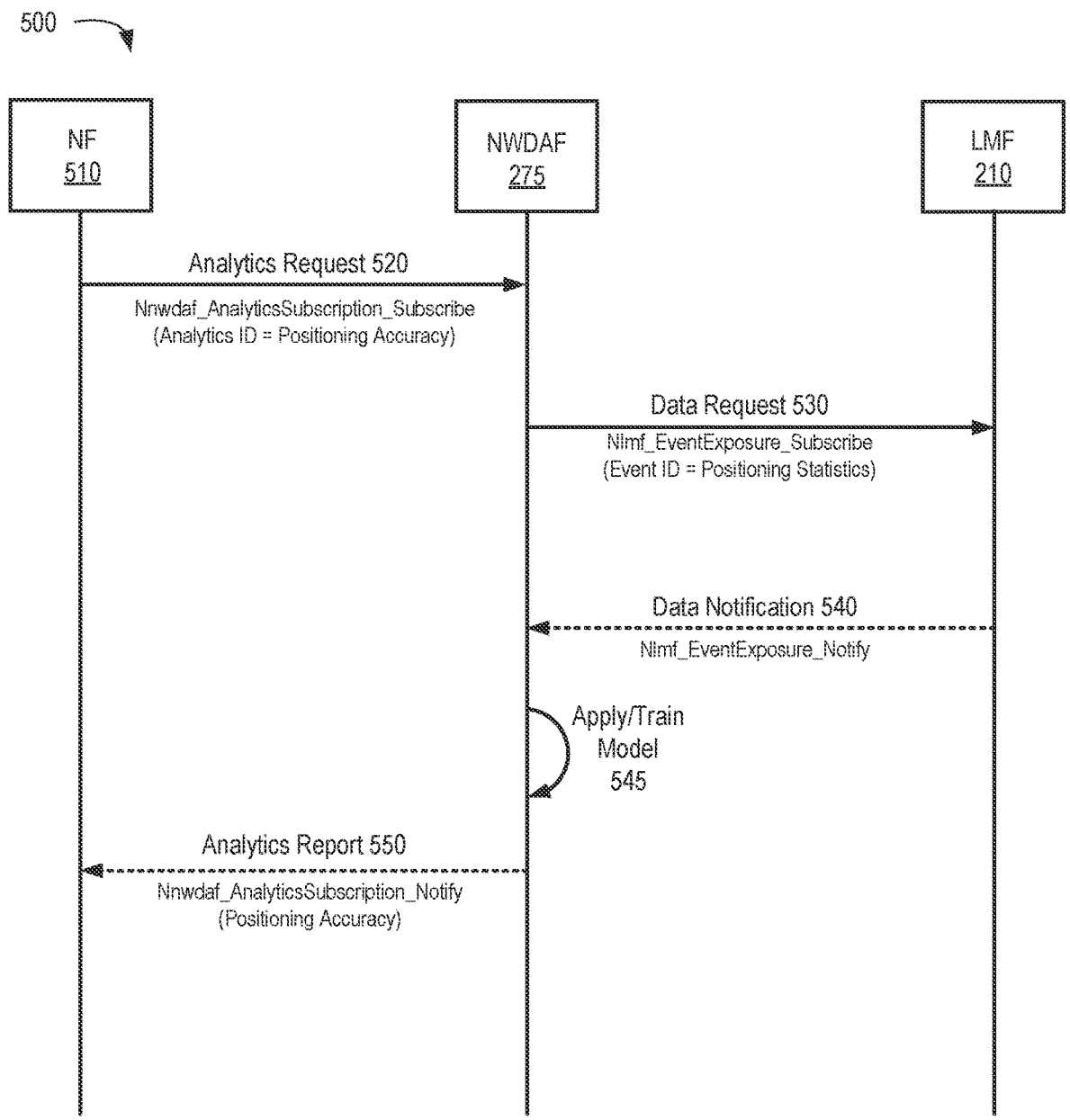
FIG. 5 is a signal flow diagram illustrating communications to provide an analytics report that includes data from an LMF.

FIG. 5 is a signal flow diagram illustrating communications in a portion 500 of network environment 100 to provide an analytics report that includes data from an LMF. As shown in FIG. 5, network portion 500 may include LMF 210, NWDAF 275, and a commissioning network function (NF) 510. NF 510 may correspond to one or more network devices 135. Communications in FIG. 5 reflect a subscription-based notification model for NWDAF analytics. Communications shown in FIG. 5 provide simplified illustrations of communications in network portion 500 and are not intended to reflect every signal or communication exchanged between devices/functions. For example, in other implementations a request-response model may be used instead of a subscription-notification model.

As shown in FIG. 5, commissioning NF 510 (e.g., a NF consumer) may subscribe to an LMF analytics service from NWDAF 275. For example, AF 230 may request analytics for positioning accuracy for UE devices 110 associated with a particular location or network. Commissioning NF 510 may send an analytics request 520 (e.g., a Nnwdaf_AnalyticsSubscription_Subscribe message) to NWDAF 275. Analytics request 520 may include an analytics identifier for a particular service (e.g., a location-assistance service) that requires data from LMF 210. The analytics identifier may correspond to positioning accuracy metrics for UE devices 110 using a given network slice type, for example. In other implementations, analytics request 520 may include a different analytics identifier for different type of location-assistance service.

NWDAF 275 may receive analytics request 520 and, in response, may set up subscriptions to collect network data that supports the analytics service requested by commissioning NF 510. For example, in one implementation, NWDAF 275 may send a data request 530 (e.g., an Nlmf_EventExposure_Subscribe message) to LMF 210-1 (e.g., a data provider in core network 130) via interface 285 to subscribe to and receive location statistics from LMF 210-1. In another example, NWDAF 275 may send a data request 530 to LMF 210-2 (e.g., a data provider in RAN 120) via interface 290 to subscribe to and receive location statistics from LMF 210-2. NWDAF 275 may select the appropriate LMF 210 to receive analytics request 520 based on, for example, a slice type and/or NSSAI obtained from UE devices 110. Data request 530 may include an event identifier (event ID) to indicate particular parameters requested from LMF 210. Data request 530 may request, for example, exact UE device locations, positioning techniques used, positioning accuracy, positioning latency, time of arrival (ToA) measurement results, placement of the LMF 210 (e.g., core or RAN), and/or abnormal behavior information for a group of UE devices 110 or a specific UE device 110.

In response to data request 530, the data provider LMF 210 may provide network data to NWDAF 275 when certain conditions are met (e.g., when a particular network slice is used, etc.). For example, data provider LMF 210-1 may send a data notification 540 (e.g., a Nlmf_EventExposure_Notify message) to NWDAF 275 via interface 285 when the requested LMF data is generated. As another example, data provider LMF 210-2 may send data notification 540 to NWDAF 275 via interface 290 when the requested LMF data is generated. In other implementations, an LMF 210 may send requested data to NWDAF 275 in real time. The data from LMF 210 may include, for example, a placement location of the responding LMF 210, a location of UE device 110, a positioning technique used by the UE device 110, positioning accuracy of the UE device 110, and/or positioning latency for the UE device 110.

NWDAF 275 may receive data notifications 540 and may apply, train, and/or update 545 an analytics model that reflects a result/indicator for the requested analytics service (e.g., as requested, for example, by analytics request 520). For example, NWDAF 275 may train a positioning accuracy model relevant to commissioning NF 510 (e.g., associated with a network slice and/or application services associated with commissioning NF 510). In some implementations, NWDAF 275 may segregate the LMF event data from other data received by the NWDAF and generate an analytics report in an isolated analytics environment.

NWDAF 275 may provide an analytics report 550, based on the training model (from step 545), to commissioning NF 510. For example, NWDAF 275 may provide an estimated positioning accuracy (which may be a range of position error values) to commissioning NF 510 using an Nnwdaf_AnalyticsSubscription_Notify message for analytics report 550. The Nnwdaf_AnalyticsSubscription_Notify message may indicate, for example, how well QoS parameters used by/for commissioning NF 510 satisfy a service level (e.g., for a service level agreement between a mobile network operator (MNO) and the end user or between the MNO and an external application service provider). In other implementations, analytics report 550 may include other information responsive to analytics request 520 described above.

Figure 6:
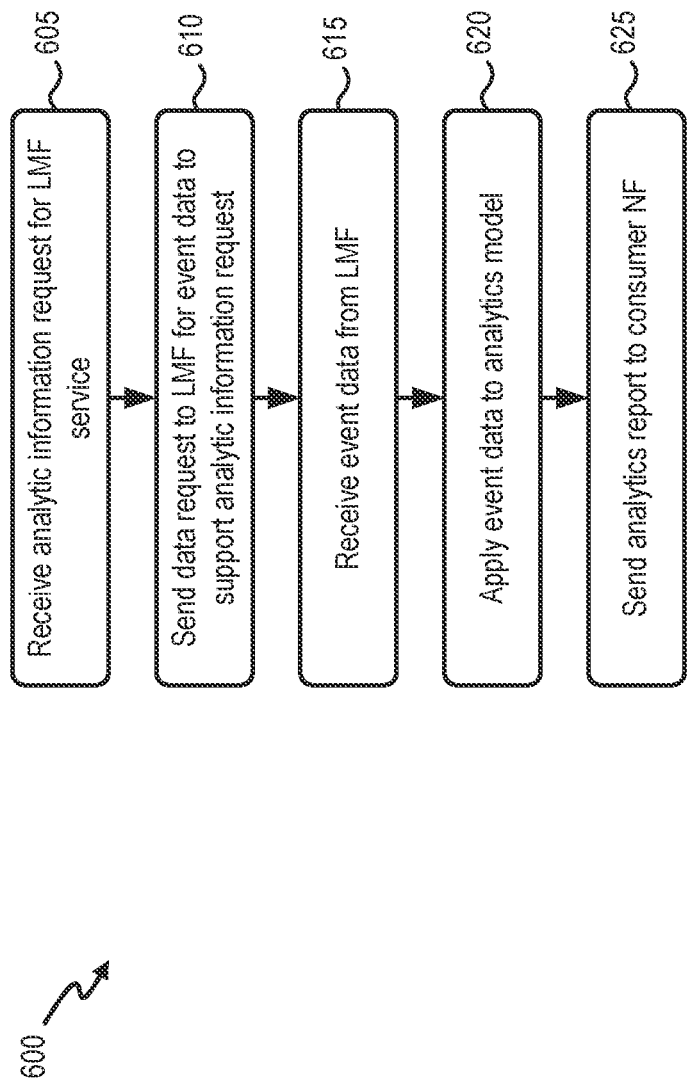
FIG. 6 is a flow diagram illustrating an example process for providing analytic reports for LMF services, according to an implementation described herein.

FIG. 6 is a flow diagram illustrating an example process 600 for providing analytic reports for LMF services, according to an implementation described herein. In one implementation, process 600 may be implemented by NWDAF 275. In another implementation, process 600 may be implemented by NWDAF 275 in conjunction with one or more other network devices in network environment 100.

Process 600 may include receiving an analytics request for an LMF service (block 605) and sending a data request to an LMF for event data to support the analytics request (block 610). For example, AF 230 may send an analytics request (e.g., an Nnwdaf_AnalyticsSubscription_Subscribe message or an Nnwdaf_AnalyticsInfo_Request message) to NWDAF 275 to request reports associated with a location-assistance service (e.g., a service provided by LMF 210). In response, NWDAF 275 may identify KPIs/data needed for the requested report and send to LMF 210-1 or LMF 210-2 a data request (e.g., an Nlmf_EventExposure_Subscribe message) via interface 285 or 290 to subscribe for the necessary KPIs/data.

Process 600 may also include receiving event data from the LMF (block 615), applying the event data to an analytics model (block 620), and sending the analytics report to the consumer NF (block 625). For example, in response to the data request from NWDAF 275, LMF 210 (e.g., LMF 210-1 or LMF 210-2) may send a data response (e.g., an Nlmf_EventExposure_Notify message, such as message 540) to NWDAF 275 via interface 285/290 with the requested KPIs/data. NWDAF 275 may receive the data response and, optionally, provide segmentation to store and process data from LMF 210 in a separate LMF analytics environment (e.g., LMF analytics environment 430). NWDAF 275 may apply an analytics model that uses the requested KPIs/data to generate an analytics report. NWDAF 275 may forward to the consumer NF (e.g., AF 230) the analytics report for the LMF service.

Figure 7A:
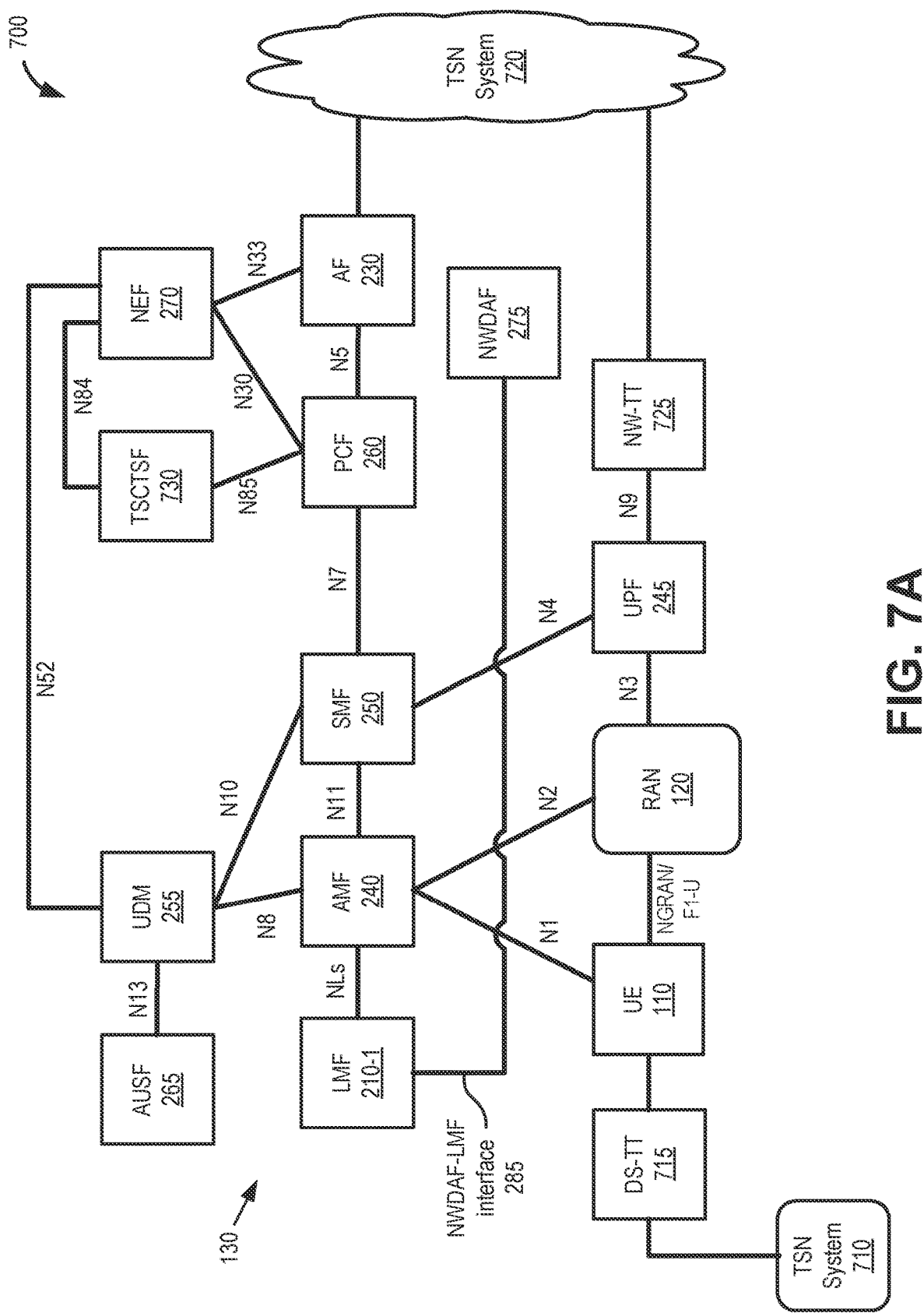
FIGS. 7A and 7B are diagrams illustrating network portions in the context of a time-sensitive networking (TSN) architecture, according to implementations described herein.
Figure 7B:
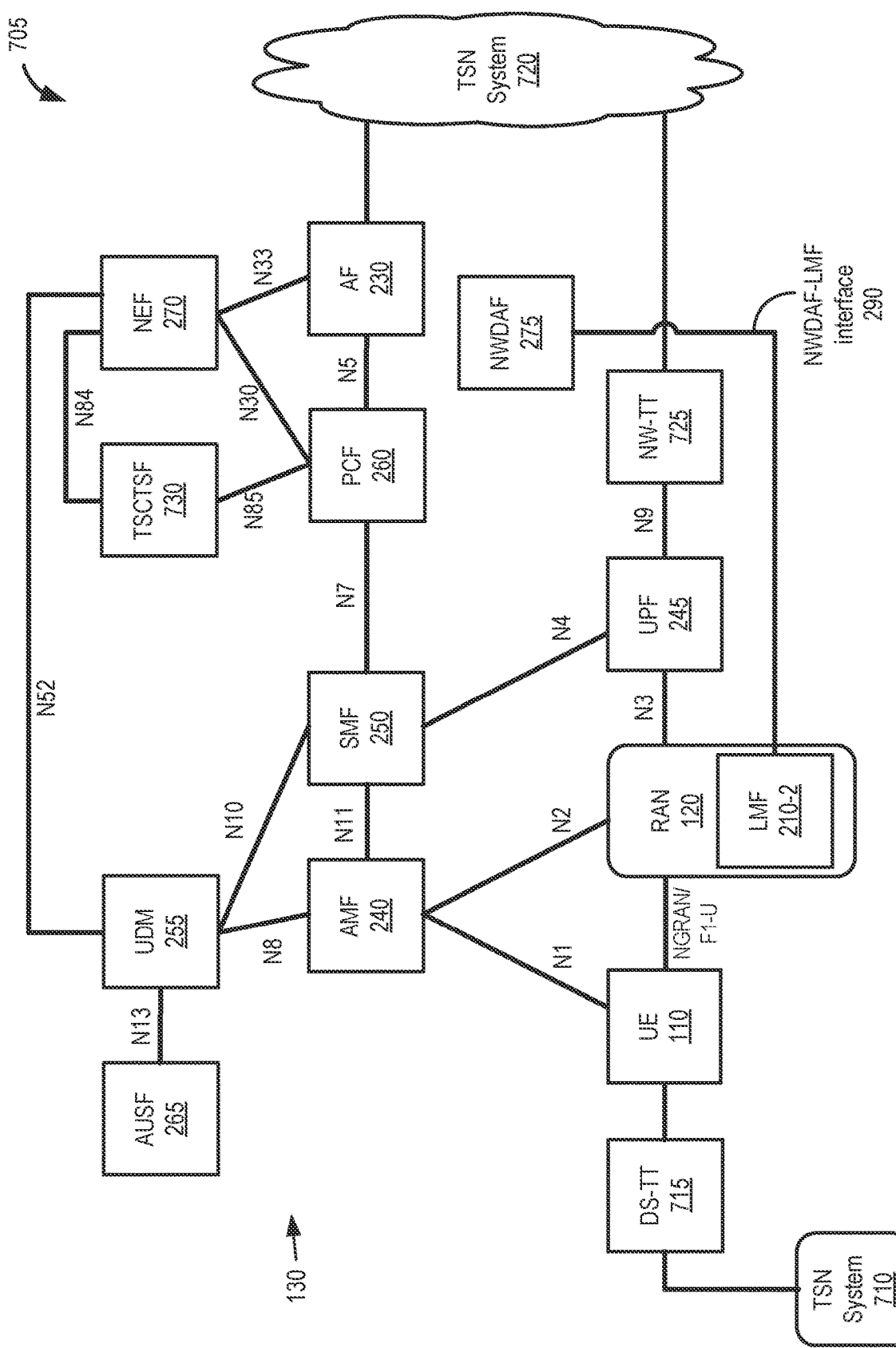

FIGS. 7A and 7B illustrate use cases for supporting an LMF interface to NWDAF in a Factories of Future setting (e.g., "Industry 4.0"), where technologies such as Internet of Things (IoT) and artificial intelligences may be used to implement automation, improve productivity, and provide self-monitoring capabilities. To support such environments, time sensitive communication and time synchronization services (collectively referred to as "TSN services) are provided between, for example, a manufacturing location and a control center. In the examples of FIGS. 7A and 7B, the TSN services may be supported on a network slice between TSN system 710 and TSN system 720. Generally, a "network slice" may encompass an end-to-end virtual network with dedicated or shared storage and/or computation resources and may be configured to implement different QoS requirements. A network slice for a TSN session may be referred to as a "TSN slice."

FIG. 7A illustrates a TSN environment (e.g., network portion 700) with LMF 210-1 deployed within core network 130. FIG. 7B illustrates a TSN environment (e.g., network portion 705) with LMF 210-2 deployed within RAN 120. Referring collectively to FIGS. 7A and 7B, network portions 700/705 may each include a UE device 110, an LMF 210, AF 230, AMF 240, UPF 245, SMF 250, UDM 255, PCF 260, AUSF 265, NEF 270, and NWDAF 275, as described above in connection with FIGS. 2A and 2B. Additionally, network portions 700/705 may each include a first TSN system 710, a Device Side TSN Translator (DS-TT) 715, a second TSN system 720, a Network Side TSN Translator (NW-TT) 725, and a Time Sensitive Communication Time Synchronization Function (TSCTSF) 730.

A 5GS (e.g., including RAN 120 and core network 130 components) may be integrated with TSN systems 710/720 as a TSN bridge. The logical TSN bridge includes TSN translator functionality for interoperation between TSN Systems 710/720 and the 5GS both for the user plane and the control plane. The translator functionality may be included in DS-TT 715 and NW-TT 725. The 5GS provides TSN ingress and egress ports via DS-TT 715 and NW-TT 725. AF 230 may request time sensitive communication and time synchronization services. In instances where AF 230 is outside of core network 130 and/or not a trusted device, NEF 270 may expose to AF 230 the 5GS capability to support a time synchronization service. In instances where AF 230 is a trusted device, AF 230 may bypass NEF 270 to communicate directly with TSCTSF 730. TSCTSF 730 may control DS-TT 715 and NW-TT 725 and may support TSC assistance container-related functionalities.

Referring to FIG. 7A, when LMF 210-1 is located within core network 130, NWDAF 275 may use an NWDAF-LMF interface 285 to request and collect LMF-related KPIs/data from LMF 210-1 regarding TSN services and/or other. Referring to FIG. 7B, when LMF 210-2 is located within RAN 120, NWDAF 275 may use an NWDAF-LMF interface 290 to request and collect LMF-related KPIs/data from LMF 210-2 regarding TSN services.

Although FIGS. 7A and 7B show certain components of network portions 700/705, in other implementations, network portions 700/705 may include fewer components, different components, differently arranged components, or additional components than depicted in FIGS. 7A and 7B. For example, in an implementation, both interfaces 285 and 290 may be included in the same network portion.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to FIG. 5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a Network Data Analytics Function (NWDAF), an information request for a location-assistance service, wherein the information request identifies a network slice type;
  selecting, based on the network slice type, a Location Management Function (LMF) to receive a data request, wherein selecting the LMF includes selecting from a radio access network RAN)-based LMF and a core network-based LME;
  sending, by the NWDAF and to the LMF using a dedicated interface between the NWDAF and the LME, the data request based on the information request;
  receiving, by the NWDAF and from the LMF via the interface, event data responsive to the data request when the network slice type is used; and
  generating, by the NWDAF, an analytics report based on the event data.

2. The method of claim 1, wherein sending the data request further comprises:
  sending the data request to the LMF located in a public network.

3. The method of claim 1, wherein sending the data request further comprises:
  sending the data request to the LMF located in a private network.

4. The method of claim 1, wherein receiving the event data includes receiving, for a designated network slice type, parameters including a location of the LMF.

5. The method of claim 1, wherein receiving the event data includes receiving, for the network slice type, parameters including one or more of:
  a location of a User Equipment (UE) device,
  a positioning technique used by the UE device,
  positioning accuracy of the UE device, and
  positioning latency for the UE device.

6. The method of claim 1, further comprising:
  sending, by the NWDAF, the analytics report to an application function via an interface.

7. The method of claim 1, wherein receiving the information request includes:
  receiving an NWDAF analytics request for one of a request-response model or a subscription-notification model.

8. The method of claim 1, wherein the network slice includes a time-sensitive networking (TSN) slice.

9. The method of claim 1, further comprising:
  segregating the event data from other data received by the NWDAF.

10. A network device comprising:
  a processor to:
    receive, by a Network Data Analytics Function (NWDAF) and from another network device, an information request for a location-assistance service, wherein the information request identifies a network slice type;
    select, based on the network slice type, a Location Management Function (LMF) to receive a data request, wherein selecting the LMF includes selecting from a radio access network (RAN)-based LMF and a core network-based LMF;
    send, to the LMF using a dedicated interface between the NWDAF and the LMF, the data request based on the information request;
    receive, from the LMF via the interface, event data responsive to the data request when the network slice type is used; and
    generate an analytics report based on the event data.

11. The network device of claim 10, wherein, when sending the data request, the processor is further to:
  send the data request to the LMF located in a public network.

12. The network device of claim 10, wherein, when sending the data request, the processor is further to:
  send the data request to the LMF located in a private network.

13. The network device of claim 10, wherein, when receiving the event data, the processor is further to:
  receive, for a designated network slice type, parameters including a location of the LMF.

14. The network device of claim 10, wherein, when receiving the event data, the processor is further to receive, for the network slice type, one or more of:
  positioning latency for a UE device, or
  a positioning technique used by the UE device.

15. The network device of claim 10, wherein the processor is further to:
  send the analytics report to an application function via a standardized interface.

16. The network device of claim 10, wherein, when receiving the information request, the processor is further to:
  receive an analytics request for one of a request-response model or a subscription-notification model.

17. The network device of claim 10, wherein
  the network slice includes a time-sensitive networking (TSN) slice.

18. A non-transitory computer-readable medium containing instructions executable by at least one processor associated with a Network Data Analytics Function (NWDAF), the computer-readable medium comprising the instructions for:

receiving an information request for a location-assistance service, wherein the information request identifies a network slice type;

selecting, based on the network slice type, a Location Management Function (LMF) to receive a data request, wherein selecting the LMF includes selecting from a radio access network (RAN)-based LMF and a core network-based LMF;

sending, to the LMF using a dedicated interface between the NWDAF and the LMF, the data request based on the information request;

receiving, from the LMF via the interface, event data responsive to the data request when the network slice type is used; and generating an analytics report based on the event data.

19. The non-transitory computer-readable medium claim 18, further comprising instructions for:

segregating the event data from other data received by the NWDAF; and generating the analytics report in an isolated analytics environment.

20. The non-transitory computer-readable medium claim 18, further comprising instructions for:

sending the analytics report to an application function via a standardized interface.

* * * * *